(12) United States Patent
Kubinski et al.

(10) Patent No.: US 6,972,061 B1
(45) Date of Patent: Dec. 6, 2005

(54) COMPOUND APEX FOR VEHICLE TIRE

(75) Inventors: Donald Chester Kubinski, Medina, OH (US); Mark Daniel Banas, Cuyahoga Falls, OH (US); Thomas Alan Murray, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/148,219

(22) PCT Filed: Dec. 6, 1999

(86) PCT No.: PCT/US99/28909

§ 371 (c)(1),
(2), (4) Date: May 23, 2002

(87) PCT Pub. No.: WO01/39964

PCT Pub. Date: Jun. 7, 2001

(51) Int. Cl.[7] .................. B29D 30/00; B29D 30/34; B60C 15/00; B60C 15/06
(52) U.S. Cl. .............. 156/110.1; 156/123; 156/131; 152/539; 152/541; 152/542; 152/543
(58) Field of Search .................. 152/539, 541, 152/542, 543; 156/110.1, 123, 130.7, 131, 156/133, 135

(56) References Cited

U.S. PATENT DOCUMENTS

| | | | |
|---|---|---|---|
| 3,163,683 A | 12/1964 | Salyer et al. | |
| 4,227,563 A | 10/1980 | Grosch et al. | |
| 4,319,943 A | 3/1982 | Bayuga | |
| 4,934,431 A | 6/1990 | Agari et al. | |
| 5,080,738 A * | 1/1992 | Araki et al. | 156/136 |
| 5,117,888 A * | 6/1992 | Shimizu | 152/540 |
| 5,141,588 A * | 8/1992 | VanBuskirk | 156/401 |
| 5,221,385 A | 6/1993 | Hanada et al. | |
| 5,309,971 A | 5/1994 | Baker et al. | |
| 5,374,324 A | 12/1994 | Vinson et al. | |

FOREIGN PATENT DOCUMENTS

| | | | |
|---|---|---|---|
| EP | 0826524 | | 3/1998 |
| EP | 0887210 | | 12/1998 |
| EP | 0924108 | | 6/1999 |
| JP | 55-83606 | | 6/1980 |
| JP | 61-69438 | | 4/1986 |
| JP | 0106330 | * | 4/1990 |
| JP | 4-11505 | * | 1/1992 |
| JP | 6-270616 | * | 9/1994 |
| JP | 8-207169 | | 8/1996 |
| JP | 10-315718 | * | 12/1998 |
| WO | WO98/56604 | | 12/1998 |

* cited by examiner

*Primary Examiner*—Jeff H. Aftergut
*Assistant Examiner*—Justin Fischer
(74) *Attorney, Agent, or Firm*—Howard M. Cohn

(57) ABSTRACT

A pneumatic radial ply tire (500) comprises a tread (510), a belt structure (512), and a carcass (514). The carcass (514) has a radial ply (518) and two bead sections (530A, 530B). Each bead section (530A, 530B) has a bead (532) and a component apex (534) with a inner apex (534A), a middle apex (534B) and an outer apex (534C).

17 Claims, 5 Drawing Sheets

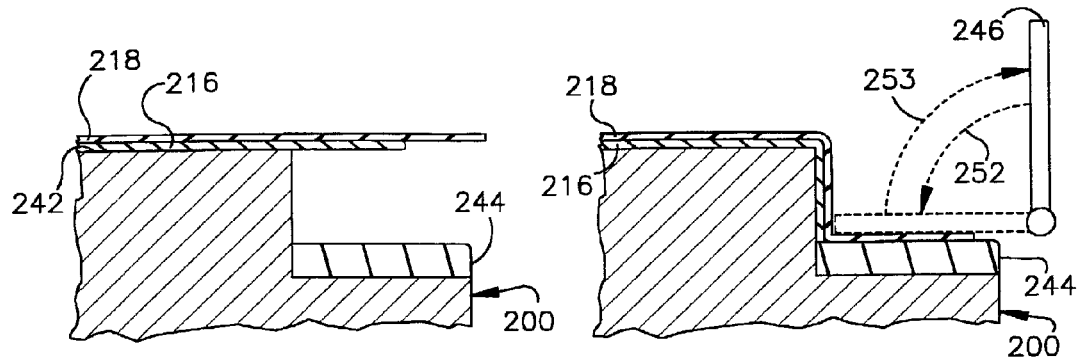
FIGURE 2A
(PRIOR ART)
FIGURE 2B
(PRIOR ART)
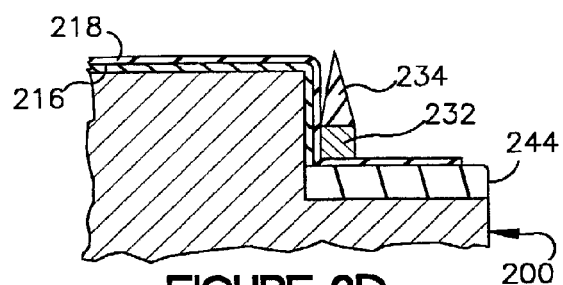
FIGURE 2C
(PRIOR ART)
FIGURE 2D
(PRIOR ART)
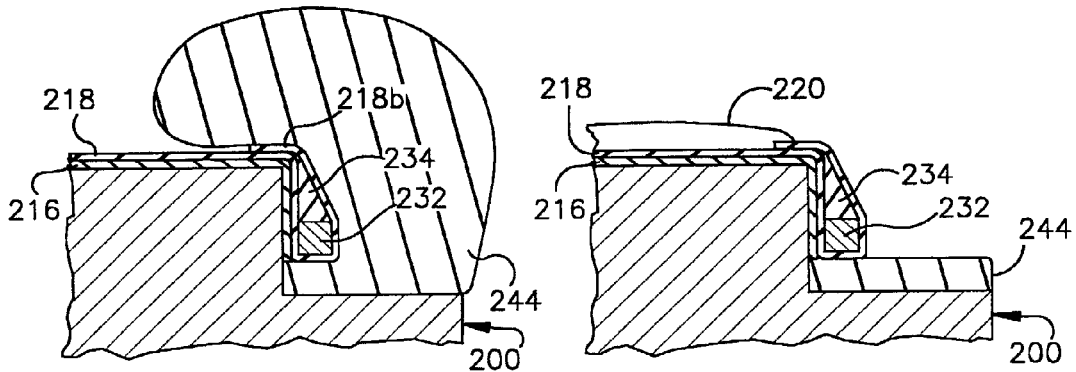
FIGURE 2E
(PRIOR ART)
FIGURE 2F
(PRIOR ART)
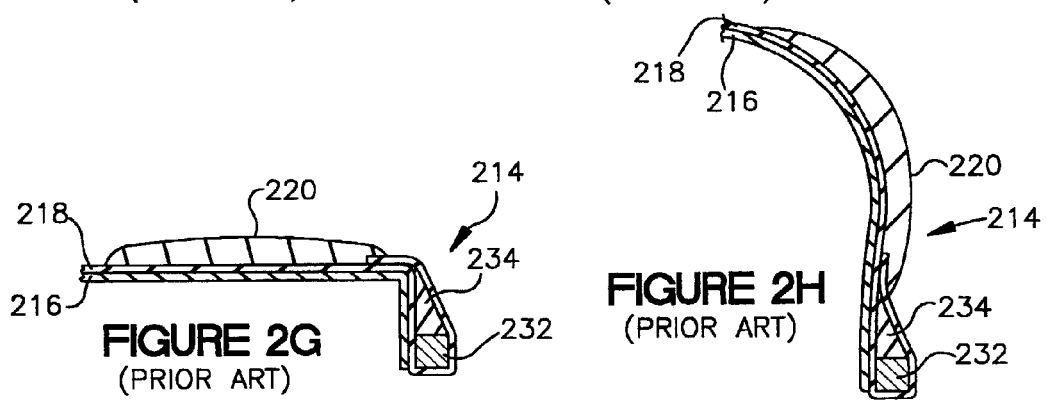
FIGURE 2G
(PRIOR ART)
FIGURE 2H
(PRIOR ART)

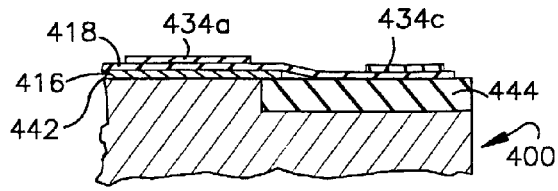
FIGURE 4A
FIGURE 4B
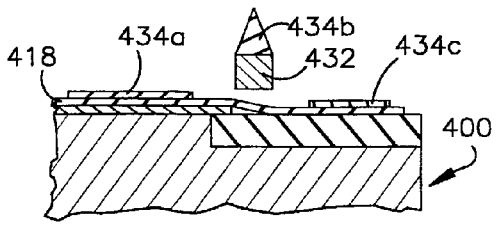
FIGURE 4C
FIGURE 4D
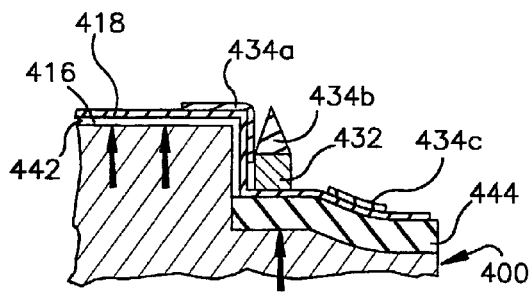
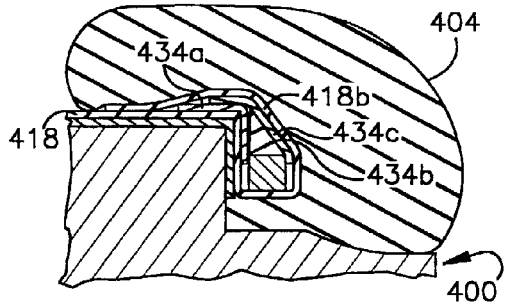
FIGURE 4E
FIGURE 4F
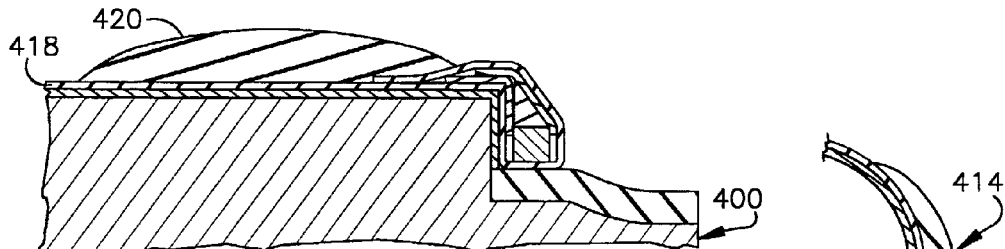
FIGURE 4G
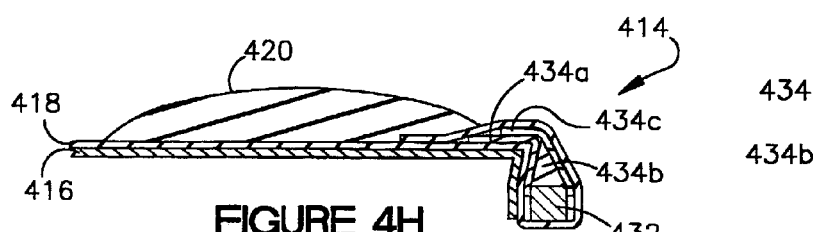
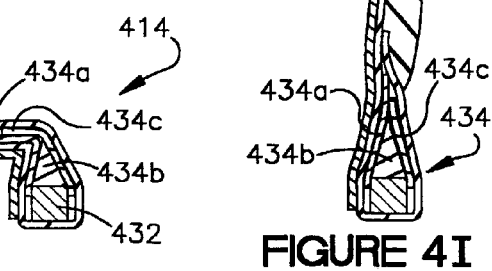
FIGURE 4H
FIGURE 4I

COMPOUND APEX FOR VEHICLE TIRE

TECHNICAL FIELD

The present invention relates to an improved design for a radial ply automobile tire, and more specifically to an improved apex for a radial ply automobile tire.

BACKGROUND OF THE INVENTION

A conventional radial-ply automobile tire includes radial plies that are wrapped around two annular inextensible beads. In the tire making process, a green tire carcass ("green" meaning as yet uncured and still tacky) is built by sliding a green innerliner and radial ply over a tire "building drum" (or "building mandrel"). Two beads (each comprising a cable of steel filaments encased in green rubber) are then slid over the carcass, one at each side. The portions of the plies that extend beyond the beads are then turned up around the beads, forming "turn-ups". Then, the portion of the plies between the beads is expanded radially outward so as to contact the ply turn-ups. The annular cross-sectionally triangular rubber filler bounded by the turned up ply and the bead is called an "apex".

There are two methods of incorporating the apex during the tire-making process. In the "pre-apexing" method, an apexing machine adheres an annular triangular apex to an annular bead. The bead, with the apex still adhering to it, is slid over the carcass on the building drum. The plies are then turned up and expanded as mentioned above, so that the apex is surrounded by the bead from below and by the plies from the sides.

In the "flat application of apex" method, the apex is circumferentially laid down onto the carcass while on the building drum. The apex is laid down as a triangular strip of green rubber ("gum strip") lying horizontally on the carcass, next to the bead, so that one of its tacky long flat sides adheres to the tacky green carcass, and its short base is close to, and faces, the bead. When the portion of the plies between the beads is expanded outward, the apex's wedge profile swings around 90 degrees, and rests atop the bead, aligned vertically.

The choice of triangular dimensions and material properties of the apex affects the performance of the tire, such as tire weight, sidewall stiffness, handling, ride comfort, flexural heat, material fatigue, and tire life. For example, since the apex extends up much of the length of the sidewall, increasing the stiffness of the apex increases the stiffness of the sidewall, yielding less sidewall flexing and hence less flexural heat and material fatigue, but at the cost of a rougher ride. Increasing the apex's radial length (so that it travels farther up the sidewall) further stiffens the sidewall and improves handling, which is beneficial for "high performance" tires.

Tire designers at Goodyear Tire and Rubber Company have found that they would have wider choice of, and tighter control over, tire performance if they had wider flexibility in choice of apex design—that is, if they could specify longer apexes than conventionally used, and apexes with multiple layers of different material ("compound apexes").

However, in the pre-apexing method, the radial length of the apex is limited by inadequacies of splicing and by the tendency of the apex profile to bend at its tip, called "curl-over". Apex splices, where the ends of a length of extruded rubber are spliced together to form an annular apex, are imperfect. Apex curl-over and splice imperfection are aggravated by longer radial length and softer material.

The "flat application of apex" method does not have the radial length limitation experienced by the pre-apexing method, because its apex is laid horizontally against the carcass. However, it does suffer from entrapped air which can cause internal delaminations.

The "pre-apexing" method is not suitable for making compound apexes, because the compound extrusion required for such an apex is complex to extrude and prone to deformation while standing vertical on the bead in the soft green state. The "flat application of apex" method is not suitable for making compound apexes because increasing the number of apex layers increases process time and requires a more complex extruder in the building drum area.

The following patents disclose bead assemblies having either a multilayered apex, a rubber material adjacent to an apex, or a flat rubber material between the bead and ply. U.S. Pat. No. 4,319,943 discloses a method of securing a bead filler material to a bead by positioning "bead filler portions" (apex) on top of "reinforce material" (plies) on either side of the bead bundle, and folding the reinforce material around the bead bundle. U.S. Pat. No. 4,934,431, in FIG. 3, discloses a bead filler 6 (apex) disposed above a ring of bead wire 3 (bead) and a "bead reinforcing layer 8 disposed within the folded portion of the carcass 4 and extending about the bead wire 3" wherein the reinforcing layer 8 may be composed of cords of carbon fiber with a rubber latex adhesive. U.S. Pat. No. 4,227,563 discloses a tire in which "a first filler element 78 is provided to separate the turnup 30 from both the apex strip 70 and the carcass ply 28" and which also has second and third filler elements 84, 86. U.S. Pat. No. 5,374,324 discloses an apex of triangular cross-section formed of multiple apex leafs radially contacting each other. U.S. Pat. No. 5,309,971 discloses a bead assembly having a rubber bead filler 84 (apex) and a reinforced rubberized ply flipper 86. U.S. Pat. No. 5,221,385 discloses a tire having a bead core 5 (bead), a bead filler 6 (apex), and a rubber sheet 13. U.S. Pat. No. 3,163,683 discloses a tire bead assembly having a bead core, an apex and a gum tie strip of uncured rubber material. U.S. Pat. No. 4,319,943 discloses a prior art bead subassembly (FIG. 1A) having bead filler portions 30, 32 on the top surfaces of material wings (sections of ply) axially spaced from the bead bundle annular side surfaces 16,18.

JP 61 069438 discloses manufacture of a bead apex by a method wherein a bead core side part and a point side part are formed individually, and both parts are connected in a body and are made in to the bead apex. The bead apex 5 comprises a base part 5a and an end part 5b. The base part 5a is formed and attached (apparently preassembled) to the bead core. There is an end part 5b which is disposed on a carcass ply 7 on a drum 11.

EP 0 826 534 discloses a pneumatic radial tire having a rubber filler 7 composed of three different rubber stocks 7-1, 7-2, 7-3.

SUMMARY OF THE INVENTION

The present invention relates to a method of building a green tire carcass by wrapping a ply having a pair of spaced preassembled inner apexes around a building drum. Then, a pair of beads with preassembled middle apexes are mounted circumferentially over the ply to a location axially outward from the inner apexes. Next, the middle section of the ply between the inner apexes is expanded radially outward to bring the inner apexes against the middle apexes. Preferably, the ply has a pair of preassembled outer apexes, each outwardly spaced from one of the inner apexes. Each of the beads is positioned with the preassembled middle apexes between corresponding inner and outer apexes. Next, the ply turnup portions of the ply are turned up to bring the outer apexes against the corresponding middle apexes.

Preferably, the inner apexes and the outer apexes have a rectangular cross-section, and the middle apexes have a substantially triangular cross-section. The inner apexes extend radially outward further than the outer apexes and the middle apexes extend radially outward less than the outer apexes. The inner apexes, the middle apexes and the outer apexes are selected from a material of the group consisting essentially of green rubber, cured rubber, and combinations thereof.

Also according to the invention, a pneumatic radial ply tire comprises a tread, a belt structure, and a carcass. The carcass has a radial ply and two bead sections. The tire is characterized by each bead section having a bead and a compound apex with an inner apex and a middle apex. The compound apex preferably also has an outer apex. The inner apex and the outer apex have a substantially rectangular cross-section, and the middle apex has a substantially triangular cross-section. Preferably, the inner apex extends radially outward further than the outer apex and the middle apex extends radially outward less than the outer apex. The inner apex, the middle apex and the outer apex are each of a material selected from the group consisting essentially of green rubber, cured rubber and combinations thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in some of the drawings may be illustrated not-to-scale for illustrative clarity.

In the drawings, the hundredth's place of each reference number usually matches the figure number, and similar elements are usually referred to by similar reference numbers. For example, element 199 in FIG. 1, element 299 in FIG. 2, and element 399 in FIG. 3 usually indicate corresponding or substantially similar elements.

In a single drawing, similar elements may be assigned the same number. For example, both beads of the same tire may be assigned the same numeral.

For illustrative clarity, the cross-sectional views presented herein may be "near-sighted" cross-sectional views, omitting certain background lines that would otherwise be visible in a true cross-sectional view.

Figure 1A:
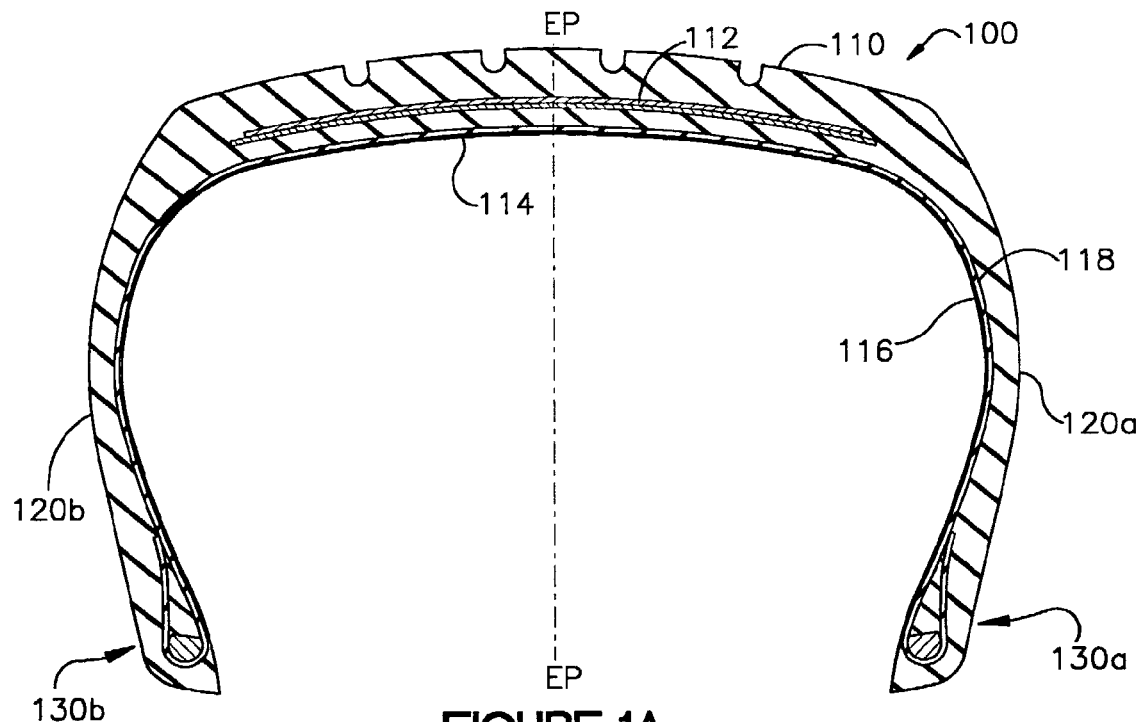
Figure 1B:
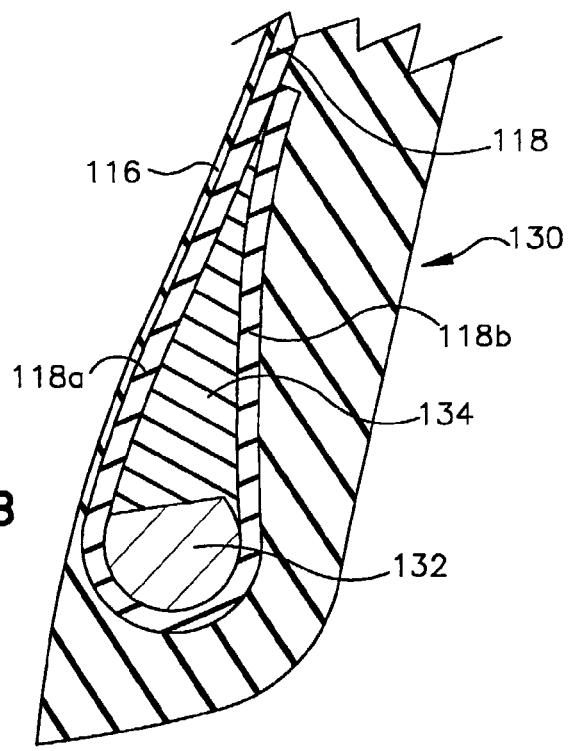
Figure 5A:
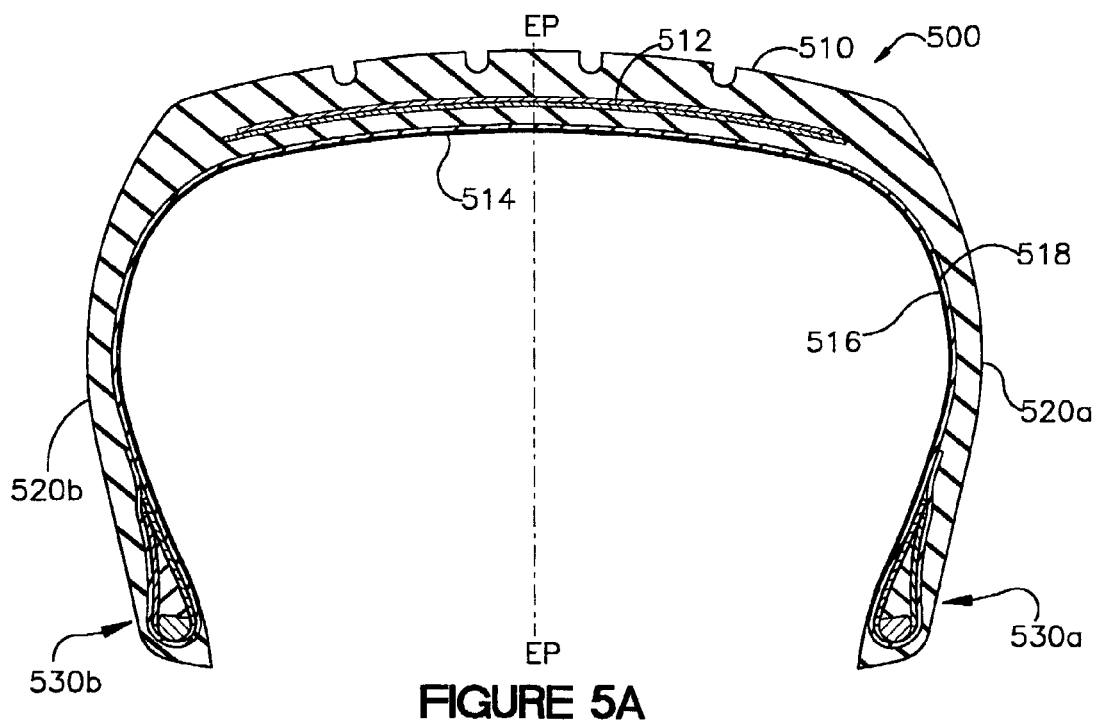
Figure 5B:
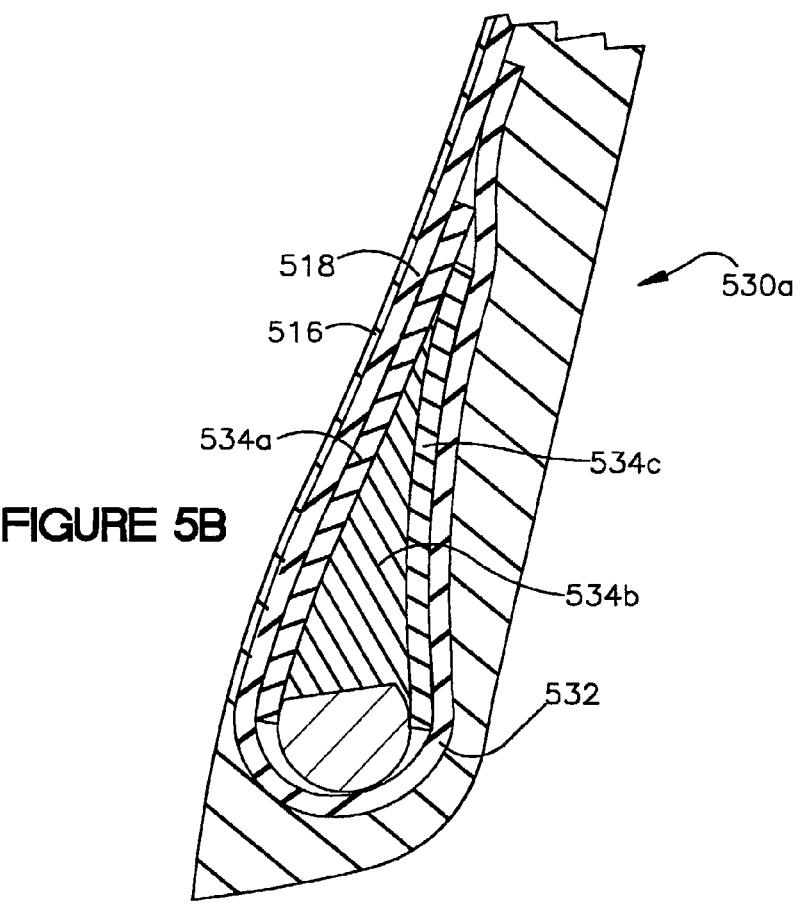

The structure, operation, and advantages of the invention will become further apparent upon consideration of the following description taken in conjunction with the accompanying drawings, wherein:

FIG. 1A shows a meridional cross-section of a typical conventional radial ply pneumatic tire;

FIG. 1B shows a cross-section of the bead section of FIG. 1A;

FIGS. 2A–2H illustrate the steps of the prior art "positive crown" method of building a green carcass, entailing the "pre-apexing" method of affixing an apex onto a bead;

FIGS. 3A–3G illustrate the steps of the prior art "negative crown" method of building a green carcass, entailing the "flat application of apex" method of affixing the apex onto a bead;

FIGS. 4A–4I illustrate the steps of building a green carcass according to the present invention;

FIG. 5A shows a meridional cross-section of a finished radial ply pneumatic tire according to the present invention; and FIG. 5B shows a cross-section of the bead section of FIG. 5A.

DEFINITIONS

"Bead" means an annular tensile member that is associated with holding the tire to the rim. The beads are wrapped by ply cords and shaped, with or without other reinforcement elements such as flippers, chippers, apexes or fillers, toe guards and chafers.

"Belt structure" means at least two annular layers or plies of parallel cords, woven or unwoven, underlying the tread, unanchored to the bead, and having both left and right cord angles in the range from 18 to 30 degrees relative to the equatorial plane of the tire.

"Meridional" refers to a laterally disposed curved line that lies in a plane that includes the axis of the tire.

"Ply" means a cord-reinforced layer of rubber-coated radially deployed or otherwise parallel cords.

"Radial" and "radially" mean in a direction perpendicular to the axis of rotation of the tire.

"Radial ply tire" means a belted or circumferentially restricted pneumatic tire in which at least one ply has cords which extend from bead to bead.

"Sidewall" is the portion of a tire between the tread and the bead.

DETAILED DESCRIPTION OF THE INVENTION

FIG. 1A shows a meridional cross-section of a typical conventional radial ply tire 100, comprising a tread 110, a belt structure ("belts") 112 comprising one or more belts, and a carcass 114. The carcass 114 has an innerliner 116, at least one radial ply 118, two sidewalls 120A,120B, and two identical bead sections 130A,130B.

FIG. 1B shows a cross-section of the bead section 130A of FIG. 1A. The reference numbers match those of FIG. 1A. It should be understood that the construction of the bead section 130B (not shown) is the same as that of the bead section 130A. The bead section 130A includes a bead 132 comprised of a bundle of wound steel filament in a rubber matrix. The ply 118 is wrapped around the bead, forming a ply inner section 118A and a ply turnup 118B. An apex 134 of rubber is surrounded by the bead 132, the ply inner section 118A and the ply turnup 118B.

In the tire building process, there are two methods of building a green tire carcass ("green" meaning as yet uncured and still tacky), which differ in how the apex is affixed to the bead. The "positive crown" method of building a green carcass includes the "pre-apexing" method of affixing the apex. The "negative crown" method of building a green carcass includes the "flat application of apex" method of affixing the apex.

FIGS. 2A–2H diagrammatically illustrate the steps of the prior art "positive crown" method of building a green carcass, entailing the "pre-apexing" method of affixing an apex onto a bead, showing a cross-section of a portion of a first stage tire building drum 200 as tire components are added and shaped. Although the following description is described in terms of only one side of the tire, it should be understood that the procedure applies to the other side of the tire (not shown) as well.

The drum 200 has an axially-central metal surface 242, and an inflatable bladder 244 along the axially-outer portion of its surface. As shown in FIG. 2A, a green rubber innerliner 216 and then a green ply 218 (comprised of inextensible polymer cords in a green rubber matrix) are slid over the building drum 200. Then, as shown in FIG. 2B, swab down paddles 246 swing down (as shown by arrow 252) to press the down the outer portion of the innerliner 216 and the ply 218 and then swing back up (as shown by arrow 253). Then, as shown in FIG. 2C, an apexing machine (not shown) preassembles (adheres) a triangular green rubber apex 234 over a bead 232 (comprising a cross-sectionally square bundle of wire filaments in a green rubber matrix). Then, as shown in FIG. 2D, the bead 232, with the apex 234 still adhering to it, is spliced to form a ring and is positioned circumferentially around the ply 218. Then, as shown in FIG. 2E, the bladder 244 is inflated to turn up the radially-outer portion of the ply 218, forming a ply turnup 218B which bends around the bead 232 and the apex 234. Then, as shown in FIG. 2F, a green sidewall 220 is affixed over (adhered to) the ply 218. Then, as shown in FIG. 2G, the resulting assembly is removed from the building drum 400. The resulting assembly, including the innerliner 216, the ply 218, the bead 232 and the apex 234, is called a green carcass 214. Then, as shown in FIG. 2H, the green carcass 214 is inflated to a toroidal shape, and its radially-outer surface is pressed against a tread and belt package (not shown).

In subsequent steps, the resulting assembly is stitched (rolled with a roller) to remove air pockets and to press internal surfaces together to yield good adhesion between adjacent materials, and the resulting assembly is inserted into a mold to cure under heat and pressure. During the aforementioned shaping process, and especially during curing, when the green rubber matrix of the bead 232 temporarily softens, the bead's previously square cross-sectional profile becomes semicircular (flat top and round bottom) as it is in the final tire (as shown as bead 132 in FIG. 1B).

The advantages of having the flexibility to design a radially long apex and an apex of multiple layers of different material ("compound apex") were described in the Background section above. Unfortunately, in the pre-apexing method, described above, the apex must be short and stiff, due to splicing imperfection and the tendency for "curl-over" (both of which are aggravated by increased apex radial length and apex softness). Also, the pre-apexing method is not suitable for making compound apexes, because compound apexes are complex to extrude and prone to deformation while standing vertical in the soft green state.

FIGS. 3A–3F diagrammatically illustrate the steps of the prior art "negative crown" (or "flat building") method of building a green carcass, entailing the "flat application of apex" method of affixing the apex onto the bead, showing a cross-section of a portion of a first stage tire building drum 300 as tire components are added and shaped. Although the following description is described in terms of only one side of the tire, it should be understood that the procedure applies to the other side of the tire (not shown) as well.

Figure 3A:
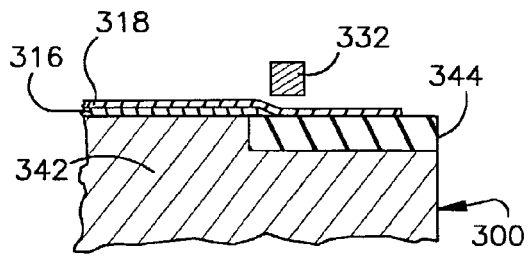
Figure 3B:
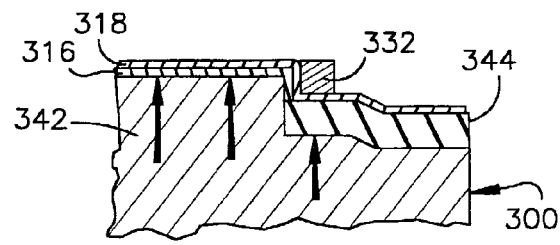
Figure 3C:
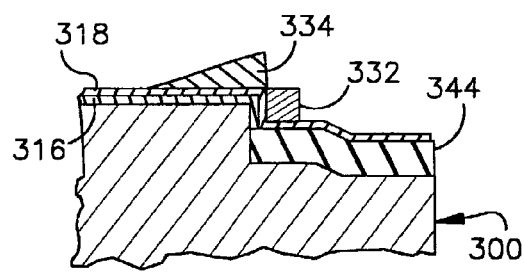
Figure 3D:
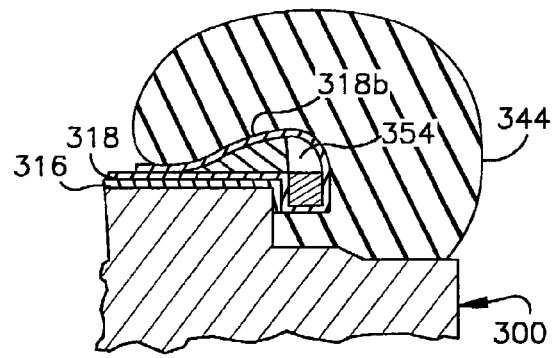
Figure 3E:
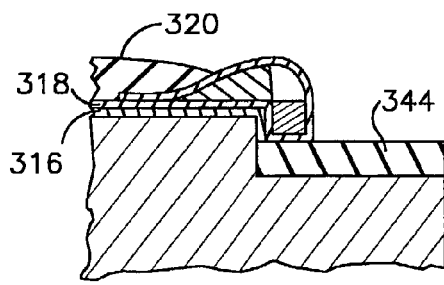
Figure 3F:
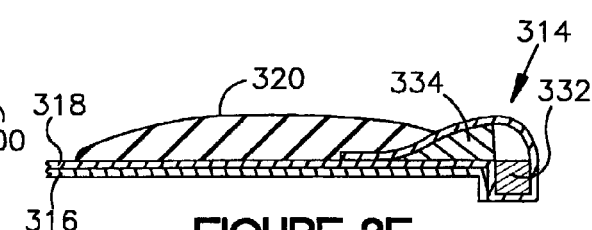

The drum 300 has an expandable metal central surface 342 around the axially-center portion of its surface, and an inflatable bladder 344 around the axially-outer portion of its surface. As shown in FIG. 3A, a green rubber innerliner 316 and then a green ply 318 are wrapped around (over) the building drum 300. A bead 332 (same as bead 232 in FIG. 2B) is positioned around, but not touching, the ply. Then, as shown by the arrows in FIG. 3B, the central surface 342 is expanded radially outward to tighten against the ply 318, and the axially-inner portion of the bladder 344 is expanded radially outward to tighten against the bead 332. Then, as shown in FIG. 3C, an apex 334 (a substantially-triangular strip of green rubber "gum strip") is laid over the green ply 318, lying "flat" on its side (from which this apex application method gets its name), so that one of its tacky sides adheres to the tacky green ply 318. Then, as shown in FIG. 3D, the bladder 344 is inflated to turn up the radially-outer portion of the ply 318, forming a ply turnup 318B which bends around the bead 332 and the apex 334. An undesirable air pocket 354 is formed between the bead 342, the apex 344 and the ply turnup 318B, which is only partially removed by a "stitching" roller. Then, as shown in FIG. 3E, a green sidewall 320 is adhered over the ply 318. The resulting assembly, shown in FIG. 3F, including the innerliner 316, the ply 318, the bead 332 and the apex 334, is called a green carcass 314.

Figure 3G:
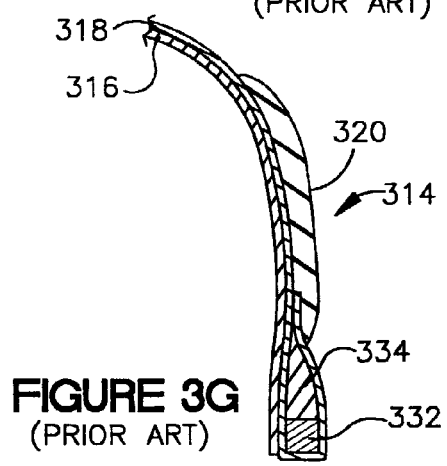

The green carcass 314 is removed from the first stage building drum and is mounted on a "second stage machine" (not shown) where it is inflated (reshaped) to a toroidal shape, as shown in FIG. 3G, and its radially-outer surface is pressed against a tread and belt package (not shown). During this reshaping, the apex 334 swings around 90 degrees to rest vertically atop the bead 332. In subsequent steps (as with the "positive crown" method), the resulting assembly is "stitched" (to remove air pockets and adhere adjacent internal surfaces together) and inserted into a mold to cure under heat and pressure to become a finished tire. As in the positive crown method, during the shaping and molding processes, the bead acquires a semicircular cross-sectional profile.

The advantages of having the flexibility to design a compound apex were described in the Background section above. Unfortunately, the "flat application of apex" method, described above, is not suitable for making compound apexes because increasing the number of apex layers would increase process time and extruder complexity. Also, the "flat application of apex" method suffers from entrapped air (originating from the air pocket 354 in FIG. 3D) which can cause internal delaminations.

FIGS. 4A–4E diagrammatically illustrate the steps of building a green carcass according to the present invention, showing a cross-section of a portion of a tire as tire components are added and shaped. Although the following description is described in terms of only one side of the tire carcass, it should be understood that the procedure applies to the other side of the tire carcass (not shown) as well.

"Off line" (i.e. before reaching a building drum), as shown in FIG. 4A, an axially-inner apex 434A and an axially-outer apex 434C are preassembled (applied, adhered) to a ply 418 in the form of thin cross-sectionally rectangular "even gum strips" of green rubber lying flat over the ply. Then, as shown in FIG. 4B, an innerliner 416 and then the ply 418 are wrapped around a building drum 400. The drum 400 is similar to the drum 300 (FIGS. 3A–3F) used in the "negative crown" tire building method. The drum 400 has an expandable axially-central metal surface 442 and an inflatable bladder 444 along the axially-outer portion of its surface. Then, as shown in FIG. 4C, an apexing machine (not shown) preassembles (adheres) a substantially-cross-sectionally triangular green rubber middle apex 434B over a bead 432 (comprising a cross-sectionally square bundle of wire filaments in a green rubber matrix). Then, as shown in FIG. 4D, the bead 432, with the apex 434 still adhering to it, is spliced to form a ring and is positioned around (but not touching) the ply 418 between the inner apex 434A and the outer apex 434C. Then, as shown by the arrows in FIG. 4E, the central surface 442 is expanded radially outward to tighten against the innerliner 416 and the ply 418, and the axially-inner portion of the bladder 444 is expanded radially outward to tighten against the bead 432. Then, as shown in FIG. 4F, the bladder 444 is inflated to turn up the axially-outer portion of the ply 418, thus bringing the outer apex 434C up against the middle apex 434B, forming a ply turnup 418B which bends over the bead 432 and the three apexes 434A–C. Then, as shown in FIG. 4G, a green sidewall 420 is adhered over the ply 418. The resulting assembly, shown in FIG. 4H, including innerliner 416, ply 418, bead 432 and apexes 434A–C, is called a green carcass 414.

The green carcass 414 is removed from the first stage building drum and is mounted on a "second stage machine" (not shown) where it is inflated (thus reshaped) to a toroidal shape, as shown in FIG. 4I, and the radially-outer surface of the carcass 414 is pressed against a tread and belt package (not shown). This reshaping straightens out the inner apex 434A and the outer apex 434C. Apexes 434A–C, adhering together (partially by their own tackiness), comprise a compound apex 434. In subsequent steps, the resulting assembly is "stitched" (to remove air pockets and adhere adjacent internal surfaces together) and inserted into a mold to cure under heat and pressure to become a finished tire.

The three apexes 434A–C are of rubber, and can be of the same or different rubber materials. The rubber materials can be either green rubber (pre-cured), cured thermoset rubber (i.e. does not resoften when heated), or thermoplastic rubber (i.e. resoftens when heated). To illustrate the design flexibility of the compound apex of the present invention, a compound apex can be comprised of an inner apex of thermoplastic, a middle apex of green rubber, and an outer apex of cured rubber.

FIG. 5A shows a meridional cross-section of a finished radial ply pneumatic tire 500 according to the present invention, comprising a tread 510, a belt structure ("belts") 512 comprising one or more belts, and a carcass 514. The carcass 514 has an innerliner 516, at least one radial ply 518, two sidewalls 520A,520B, and two identical bead sections 530A,530B.

FIG. 5B shows a cross-section of the bead section 530A of FIG. 5A. It should be understood that the cross-section of the bead section 530B (not shown) is the same as that of the bead section 530A. The bead section 530A includes a bead 532. The ply 518 is wrapped around the bead, forming a ply axially-inner section 518A and a ply turnup 518B. A compound apex 534 is comprised of an axially-inner apex 534A, an axially-middle apex 534B and an axially-outer apex 534C, and is surrounded by the bead 532, the ply inner section 518A and the ply turnup 518B.

Of the three apexes 534A–C, the inner apex 534A is typically cross-sectionally the longest and extends radially farthest outward, and the middle apex 534B is typically cross-sectionally the shortest and extends radially outward the least, although this is not necessary.

Although the compound apex 534 of the present embodiment includes an outer apex 534C, it is within the scope of the present invention for the compound apex not to include the outer apex but only the inner apex 534A and the middle apex 534B.

The three materials for the three apexes 434A–C can be chosen to achieve certain tire design characteristics (such as stiffness and handling characteristics), which is not possible with the conventional tire building methods. The compound apex 534 can be very long, because its longest component (the inner apex 434A) lies on its side while in the green state. The greater the flexibility of apex length and the greater the flexibility in selecting apex material (both of which are afforded by this invention), the greater the flexibility of, and control over, tire characteristics.

Since the inner apex 434A and the outer apex 434C are laid onto the ply 434 off-line (i.e. before mounting the ply 418 on the building drum 400), their application does not impede manufacturing throughput.

While the invention has been described in combination with embodiments thereof, it is evident that many alternatives, modifications, and variations will be apparent to those skilled in the art in light of the foregoing description. Accordingly, it is intended to embrace all such alternatives, modifications and variations as fall within the spirit and scope of the appended claims.

What is claimed is:

1. An unfinished pneumatic radial ply tire assembly comprising:
   a tread, a belt structure and a carcass;
   wherein the carcass has a radial ply and two bead sections; and
   wherein the tire is characterized by:
   each bead section having a bead and a compound apex comprising an inner apex, a middle apex and an outer apex;
   the inner apex and the outer apex have a substantially rectangular cross-section, and the middle apex has a substantially triangular cross-section; and
   the outer apex comprises cured rubber and the middle apex comprises green rubber.

2. The unfinished radial ply tire assembly of claim 1 characterized in that:
   the inner apex extends radially outward further than the outer apex, and
   the middle apex extends radially outward less than the outer apex.

3. The unfinished radial ply tire assembly of claim 2 characterized in that:
   the inner apex comprises thermoplastic.

4. A method of building a green tire carcass comprising the steps of:
   preassembling an inner apex to a ply;
   preassembling an outer apex comprising cured rubber to the ply;
   preassembling a middle apex comprising green rubber over a bead;
   wrapping the ply with the preassembled inner apex around a building drum;
   splicing the bead with the middle apex to form a ring; and
   after wrapping the ply around the drum, positioning the spliced bead around the ply;
   wherein, when the spliced bead is positioned around the ply, it is positioned between the inner apex and the outer apex.

5. The method of claim 4, further comprising:
   inflating a bladder of the drum to turn up an axially-outer portion of the ply, thus bringing the outer apex up against the middle apex, forming a ply turnup which bonds over the bead and the inner, middle and outer apexes.

6. The method of claim 4, wherein:
   when the spliced bead is positioned around the ply, it is not touching the ply.

7. The method of claim 6, further comprising:
   inflating a bladder of the drum radially outward to tighten against the bead.

8. The method of claim 4, wherein:
the building drum comprises an expandable axially-central surface and an inflatable bladder along an axially-outer portion of its surface.

9. The method of claim 6, further comprising:
expanding a central surface of the drum radially outward to tighten against the ply.

10. The method of claim 4, further comprising:
adhering a green sidewall over the ply, thereby forming a green carcass.

11. The method of claim 10, further comprising:
removing the green carcass from the building drum and mounting it on a second stage machine, then inflating the green carcass to a toroidal shape and pressing a radially-outer surface of the carcass against a tread and belt package to form a resulting assembly.

12. The method of claim 11, further comprising:
stitching the resulting assembly and inserting it into a mold to cure under heat and pressure to become a finished tire.

13. The method of claim 4, further comprising:
prior to wrapping the ply around the building drum, preassembling an outer apex to the ply;
wherein the inner, middle and outer apexes are of different rubber materials.

14. The method of claim 4, wherein:
the inner apex comprises thermoplastic.

15. The method of claim 4, wherein:
the inner apex has a rectangular cross-section.

16. The method of claim 4, wherein:
the middle apex has a cross-section which is substantially triangular.

17. The method of claim 4, further comprising:
prior to wrapping the ply around the building drum, preassembling an outer apex to the ply;
wherein the inner and outer apexes have a rectangular cross-section; and
the middle apex has a cross-section which is substantially triangular.

* * * * *